Sept. 6, 1927.

W. BRÜCKEL 1,641,732

ELECTRIC REGULATING SYSTEM

Original Filed May 24, 1924

Inventor:
Waldemar Brückel
by
His Attorney.

Patented Sept. 6, 1927.

1,641,732

UNITED STATES PATENT OFFICE.

WALDEMAR BRÜCKEL, OF TREPTOW, BERLIN, GERMANY, ASSIGNOR TO GENERAL ELECTRIC COMPANY, A CORPORATION OF NEW YORK.

ELECTRIC REGULATING SYSTEM.

Application filed May 24, 1924, Serial No. 715,594, and in Germany June 8, 1923. Renewed January 11, 1927.

My invention relates to electric regulating systems, and more particularly an improved regulating system utilizing an electric discharge tube.

In electric regulating arrangements for controlling the voltage, current, or other electrical characteristic or condition of a system, it is common to provide a control device responsive to the characteristic or condition to be regulated and arrange such device to control suitable regulating means. Where, for example, the voltage of a generator is to be maintained constant, a control winding may be connected to respond to variations in the voltage of the generator and be arranged to control means for regulating the excitation either of the generator itself or of an exciter for the generator. In systems where it is desired to maintain the speed of a motor constant, the control device may be connected in various well known ways to vary in accordance with the speed of the motor and this device may be arranged to control the speed of the motor by varying its excitation or input.

One object of my invention is to provide a new and improved arrangement for preventing hunting in a system in which the desired regulation is effected by an electric discharge tube. Another object of my invention is to provide an improved arrangement utilizing an electric discharge tube for securing sensitive and accurate regulation of the voltage or other electrical characteristic or condition of a system of the type wherein the circuit is supplied from a dynamo electric machine, the exciting current for which is supplied from an exciter which is in turn controlled by the electrical characteristic or condition of the circuit to be regulated.

My invention will be better understood from the following description, when taken in connection with the accompanying drawing, and its scope will be pointed out in the appended claims.

Figure 1:
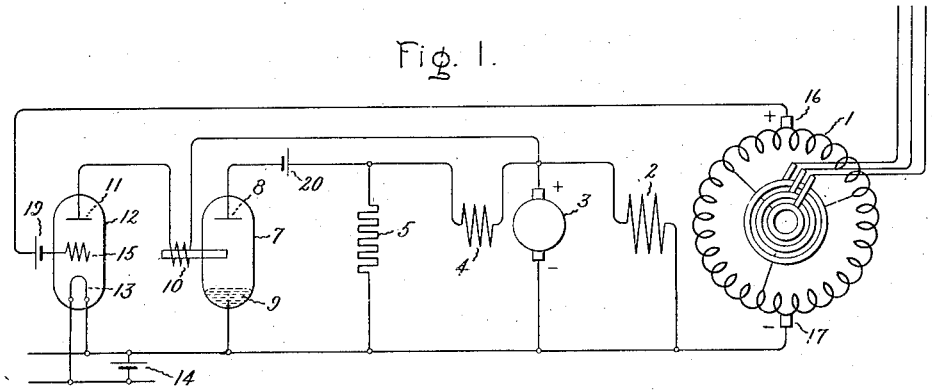
Figure 2:
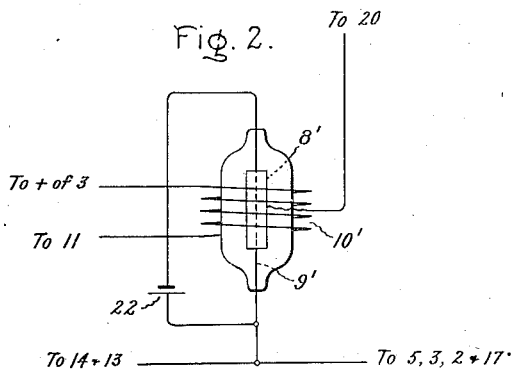

In the accompanying drawing, Fig. 1 diagrammatically shows a voltage regulating system embodying my invention, and Fig. 2 shows diagrammatically another type of electric discharge tube which may be used in the system shown in Fig. 1.

Referring to Fig. 1 of the drawing, 1 represents an alternating current generator, the voltage of which it is desired to maintain constant. The generator is provided with a field winding 2 which is energized by an exciter 3 having a shunt field winding 4 and a resistor 5 in series therewith.

In order to control the voltage of the generator, the excitation of the shunt field winding 4 of the exciter is arranged to be varied, in accordance with my invention, by means of an electric discharge tube 7 which is connected in the field circuit of the exciter so that variations in the flow of current through the tube varies the amount of current through the field winding 4. The tube 7, which may be of any suitable type, is diagrammatically shown in Fig. 1 as a mercury vapor tube in which the flow of current between the anode 8 and the cathode 9 is controlled by a magnetic field set up by the current flowing through a coil 10. Any other suitable type of tube, however, such as a magnetron, which is diagrammatically shown in Fig. 2, may be used. The feature of using a magnetron in a system for regulating an electrical condition of an electric machine or circuit is claimed broadly in a copending application of Albert W. Hull, Serial No. 69,852, filed November 18, 1925. The anode-cathode circuit of the tube 7 is connected in parallel with the resistor 5, so that when the impedance of the tube 7 is increased by increasing the magnetic field produced by the coil 10, the amount of current through the field winding 4 is decreased.

In order to vary the excitation of the generator in accordance with the variations in the voltage thereof and the exciter voltage, the coil 10 is connected between the anode 11 of another electric discharge tube 12 and the positive side of the exciter 3. The tube 12 is provided with a hot cathode 13, which is supplied by a suitable source 14, and a grid 15, which is connected to the positive brush 16 on a commutator of the generator 1. The commutator is connected to the armature winding of the generator, in a manner well known in the art, so that the direct current voltage across the brushes 16 and 17 varies with the alternating current voltage of the generator. It will be evident, however, that my invention is not limited to this particular means of obtaining a direct current voltage that varies in accordance with the alternating current voltage, but that any other well known means for obtaining such a voltage may be used. The cathodes 13 and 9 of the tubes 12 and 7, respectively, are connected to the negative brushes of the exciter 3 and the generator 1. To one skilled in the art, it is evident that suitable amplifying tubes may be provided in the grid circuit of the tube 12 if desired. Also, a source of negative biasing voltage 19 may be provided in the grid circuit of the tube 12, and a source of voltage 20 may be provided in the anode circuit of the tube 7.

The operation of the system shown in Fig. 1 is as follows: It is evident that when the generator voltage 16 remains constant, the voltage of the grid 15 remains constant with respect to the cathode 13. Under these conditions the current through the coil 10 is continuously increasing above and decreasing below the value required to maintain the exciter voltage at the necessary value to hold constant generator voltage. When the exciter field current is too great, the exciter voltage becomes too high, and, therefore, more current flows through the coil 10. This increase in the current through the coil 10 decreases the current through the tube 7 so that the excitation of the exciter is decreased. Due to the time lag of the field winding 4, the regulator decreases the excitation of the exciter too much, so that the voltage of the exciter instead of being restored only to the desired value, decreases slightly below this value. When the exciter voltage is too low, the decrease in the current through coil 10 causes the current through the tube 7 to increase. This increase in the current through the tube 7 increases the excitation of the exciter so that the exciter voltage again becomes too high. Then the above described cycle of operation is repeated. Therefore, it will be observed that so long as the generator voltage remains constant, the regulator causes the excitation of the exciter to be varied continuously, in the same manner as a well known Tirrill regulator does under similar conditions.

Due to the inductance of the field winding 2 of the generator, the small variations in the exciter voltage produced by the fluctuating exciter field current have substantially no effect upon the generator voltage so long as the load on and the speed of the generator do not change the generator voltage. When, however, the generator voltage changes, the potential of the grid 15 changes to vary the amount of current through the tube 12. For example, when the voltage of the generator 1 increases, the grid 15 becomes more positive or less negative with respect to the hot cathode 13, so that more current flows through the coil 10. This increase in the current through the coil 10 increases the magnetic field produced by the coil so that the current through the tube 7 decreases. Consequently, the exciter voltage decreases, and this in turn decreases the generator voltage. As soon as the exciter voltage reaches the necessary value to maintain the generator voltage constant, the regulator then operates in the manner above described to control the excitation of the exciter in response to variations in this new value of exciter voltage.

Similarly, when the voltage of the generator decreases, the grid 15 becomes less positive or more negative with respect to the hot cathode 13 so that less current flows through the coil 10. This decrease in the current through the coil 10 decreases the magnetic field produced by the coil so that the current through the tube 7 increases. Consequently, the exciter voltage increases, and this in turn increases the generator voltage. As soon as the exciter voltage reaches the necessary value to maintain the generator voltage constant, the regulator then operates in the manner above described to control the excitation of the exciter in response to variations from this new value of exciter voltage.

Furthermore, it is evident that, since any change in the excitation of the exciter changes the voltage of the exciter before it changes the voltage of the generator, the changes in the exciter voltage produced by variations in the generator voltage change the current through the coil 10 in such a manner as to prevent the excitation of the field winding 2 being changed too much in restoring the generator voltage to its normal value.

In the magnetron, which is diagrammatically shown in Fig. 2, were used instead of the mercury vapor tube shown in Fig. 1, the anode 8', cathode 9', and coil 10' thereof would be connected in the same manner as the anode 8, cathode 9, and coil 10 of the tube 7. Since the magnetron has a hot cathode, it is necessary to provide a suitable source 22 of heating current therefor.

While I have, in accordance with the patent statutes, shown and described my invention as applied to a particular system, and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is,—

1. In a regulating system wherein the desired regulation is obtained by controlling the excitation of a dynamo electric machine, the combination of an exciter for said machine, an electric discharge tube connected to regulate the excitation of said exciter, and means operative in response to a predetermined electrical characteristic of said exciter and to the condition being regulated for varying the regulating effect of said tube.

2. A voltage regulating system for a generator comprising an exciter for said generator, an electric discharge tube connected to regulate the excitation of said exciter, and means controlled by the voltages of said exciter, and said generator for varying the regulating effect of said tube.

3. In a regulating system wherein the desired regulation is obtained by controlling the excitation of a dynamo electric machine, the combination of an exciter for said machine, an electric discharge tube connected to regulate the excitation of said exciter, a coil arranged to control the current through said tube, and means for varying the current through said coil in accordance with the condition being regulated and a predetermined characteristic of said exciter.

4. A voltage regulating system for a generator, comprising an exciter for said generator, an electric discharge tube connected to regulate the excitation of said exciter, a coil arranged to control the current through said tube, a circuit for said coil arranged to be energized by a voltage which varies with the voltage of said exciter, and means for varying the impedance of said circuit inversely with the voltage of said generator.

5. A voltage regulating system for a generator comprising an exciter for said generator, an electric discharge tube connected to regulate the excitation of said exciter, a coil arranged to control the current through said tube, a circuit for said coil arranged to be energized by a voltage which varies with the voltage of said exciter, and a second electron device connected in said circuit and arranged to vary the current therein in accordance with the voltage of said generator.

6. A voltage regulating system for a generator comprising an exciter for said generator, a field circuit for said exciter, a resistor in said field circuit, an electric discharge tube having its anode and cathode circuit connected in shunt around said resistor, a coil arranged to control the passage of current between the anode and cathode of said tube, a circuit for said coil energized by said exciter, a second electric discharge tube connected in series in said coil circuit, and means operative in response to the voltage of said generator for controlling the current through said second electric discharge tube.

In witness whereof, I have hereunto set my hand this 9th day of May, 1924.

WALDEMAR BRÜCKEL.